July 27, 1937.  A. DE VRIES  2,088,320
FASTENING
Filed Sept. 11, 1935  2 Sheets-Sheet 1

July 27, 1937. A. DE VRIES 2,088,320
FASTENING
Filed Sept. 11, 1935 2 Sheets-Sheet 2

Inventor
Abraham de Vries
By Pennie Davis Marvin & Edmonds
Attorneys

Patented July 27, 1937

2,088,320

UNITED STATES PATENT OFFICE 2,088,320

FASTENING

Abraham de Vries, Amsterdam, Netherlands, assignor to N. V. Yzerhandel I. M. de Vries, Amsterdam, Netherlands, a corporation of the Netherlands Application September 11, 1935, Serial No. 40,102
In Great Britain February 15, 1935

2 Claims. (Cl. 189—36)

This invention relates to improvements in fastenings, for fastening one member to another member, and has for an object to provide improved fastening means which is concealed when the member to be fastened is in position.

A further object is to permit the fastened member readily to be detached when desired from the co-operative member without necessity for removal and eventual replacement of fastening elements such as screws or the like.

The member to be fastened may include a part formed or provided with a hook, handle, bracket, or any other type of article, or the member to be fastened may be, for example, a plate serving the purpose, for instance, of a closure, or may be formed as a box cover, or the member to be fastened may be a structural member of a show-case or other article.

The mating surfaces of the two members may be ruled surfaces or surfaces of revolution.

Figure 1:
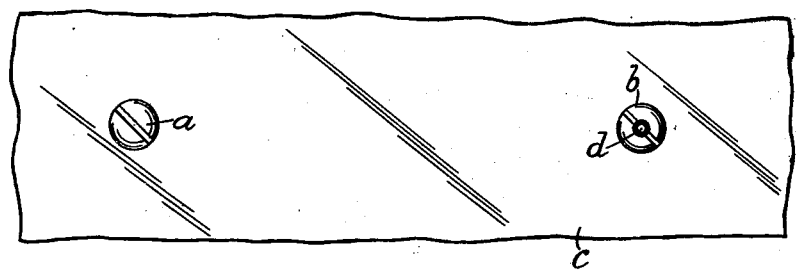
Figure 2:
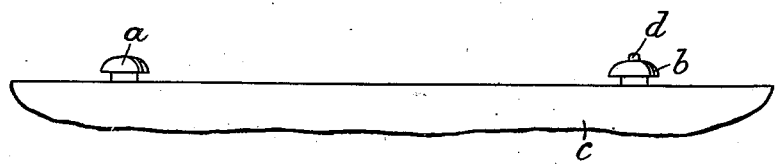
Figure 3:
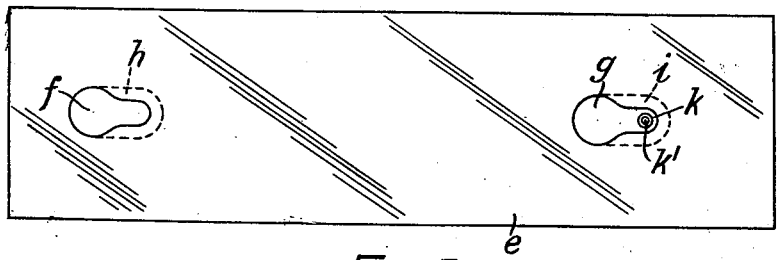
Figure 4:
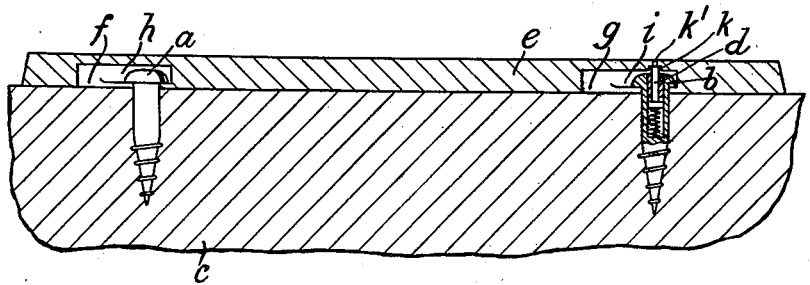

A few embodiments illustrative of different practical applications of the invention are shown by way of example in the accompanying drawings, in which Figs. 1 to 4 illustrate the fastening of a plate member to a co-operative member, Figs. 1 and 2 showing in plan and in elevation, respectively, the co-operative member with two connecting elements, one incorporating a spring-urged detent, Fig. 3 is an inverted plan view of the plate member and Fig. 4 is a section showing both members in interlocked engagement.

Figure 6:
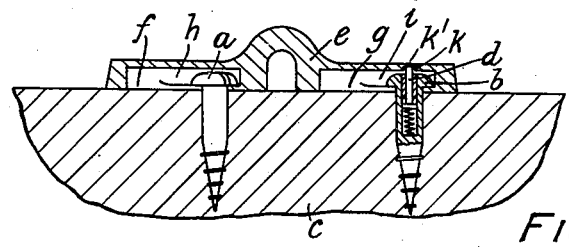
Figure 5:
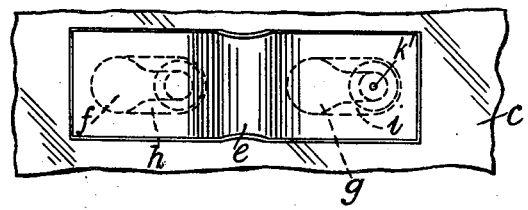
Figure 7:
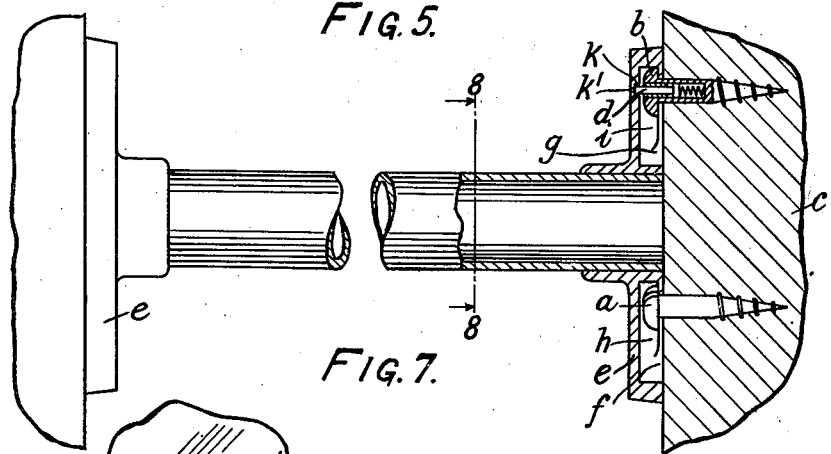
Figures 8, 9:
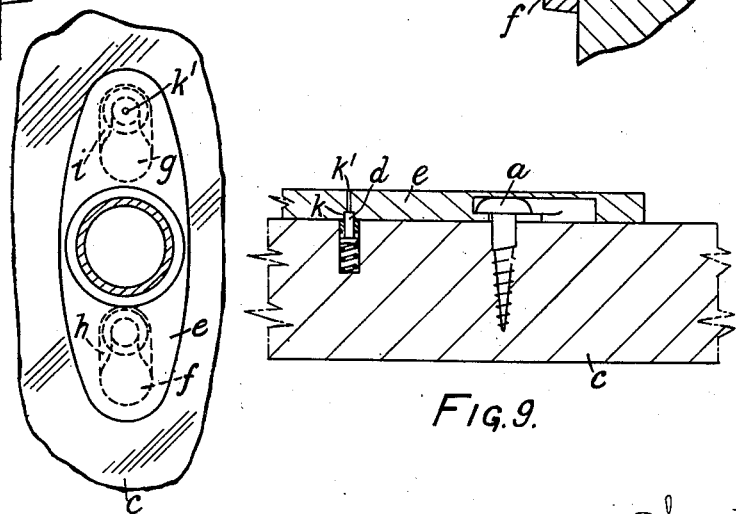

Figs. 5 and 6 illustrate in plan and in section, respectively, a second embodiment in which the detachable one of the co-operative members is in the form of a bracket. Figs. 7 and 8 illustrate a third embodiment of a fastening applied to the support of a towel rail or the like, Fig. 7 showing the towel rail and fastening partly in elevation partly in section, and Fig. 8 being a section on the line 8—8 of Fig. 7.

Fig. 9 is a fragmentary detail section illustrative of a further modification.

In each of the embodiments illustrated the fastening includes a pair of connecting elements in the form of screw-pins presenting shouldered heads $a$ and $b$, and threaded in spaced relation into a plane member $c$ to which is to be detachably fastened a plane member $e$ which, in the construction shown in Figs. 1–4 is constituted by a plate and which, in the constructions shown in Figs. 5 and 6, and in Figs. 7 and 8, is constituted by a bracket.

The screw-pin presenting the head $b$ incorporates a spring-urged detent $d$ which projects axially through the head $b$ and is depressible within the head $b$.

The member $e$ is formed with two spaced keyhole slots $f$, $g$ pitched for locking engagement under the pin heads $a$, $b$, respectively, and opening into undercut recesses $h$, $i$, respectively, which accommodate the pin heads $a$, $b$ when the member $e$ is fastened to the member $c$. As will be understood, in order to fasten the member $e$ to the member $c$, it is merely necessary to register the wide ends of the slots $f$, $g$ with the pin heads $a$, $b$ and then to slide the members relatively to bring the narrow ends of the slots $f$, $g$ into locking engagement with the pin heads $a$, $b$. As the members $c$, $e$ are slid relatively to one another towards fastened position, the detent $d$ snaps into locking engagement with a socket $k$ in the roof of the recess $i$ whereby to lock the members against relative sliding movement in the direction to unfasten the members. Formed through the roof of the recess $i$ in register with the socket $k$ is a small orifice $k'$ which is scarcely visible from the exterior of the member $e$ but which is adapted to permit depression and release of the detent $d$ by the introduction through the orifice $k'$ of a pointed tool, when it is desired to unfasten the members $c$, $e$, from one another.

In lieu of incorporating the detent $d$ in one of the connecting elements, the detent $d$ may be incorporated in one of the members $c$ or $e$, as shown in Fig. 9, in which figure the detent $d$ is incorporated in the member $c$ for locking engagement with a socket $k$ in the member $e$.

I claim:—

1. A fastening comprising a member having a slot formed in one side face, but which does not extend through to the opposite side face of the member, a second member having a screw threaded therein with the head spaced from the face of the member to overlie the sides defining said slot, said first member having a socket opening into the slot, and the screw having a spring-urged detent extending through the head thereof and adapted to extend into said socket to form an abutment for preventing accidental unfastening of said members, said first member also having an aperture leading to the socket through which an instrument may be inserted to disengage the detent from the socket.

2. A fastening device comprising a pair of members having abutting faces, one of said members being relatively stationary and the other of said members being movable relative thereto, one of said members having a lug and the other of said members having a cooperating portion adapted upon relative movement of said members in a plane substantially parallel to said abutting faces to engage behind said lug and form therewith an interlocking connection, said stationary member having a bore extending inwardly from its said abutting face, a longitudinally-reciprocable pin in said bore, said pin being spring-urged and normally extending outwardly from said abutting face of said relatively stationary member to form an abutment for positively preventing relative movement of said members in a direction to disengage said lug from the cooperating portion of the other member without damaging said pin, said relatively movable member having a socket extending from its said abutting face and, when said members are secured together, aligning with the bore in said relatively stationary member and receiving the projecting end of said pin, said socket extending through said relatively movable member to an opposite face thereof, so that an instrument may be inserted into it to depress said pin to permit operation of said members.

ABRAHAM DE VRIES.